Aug. 13, 1968 HIROSHI TADO 3,396,708
OILTIGHT SEALING DEVICE FOR ROTARY PISTON ENGINES
Filed March 2, 1966
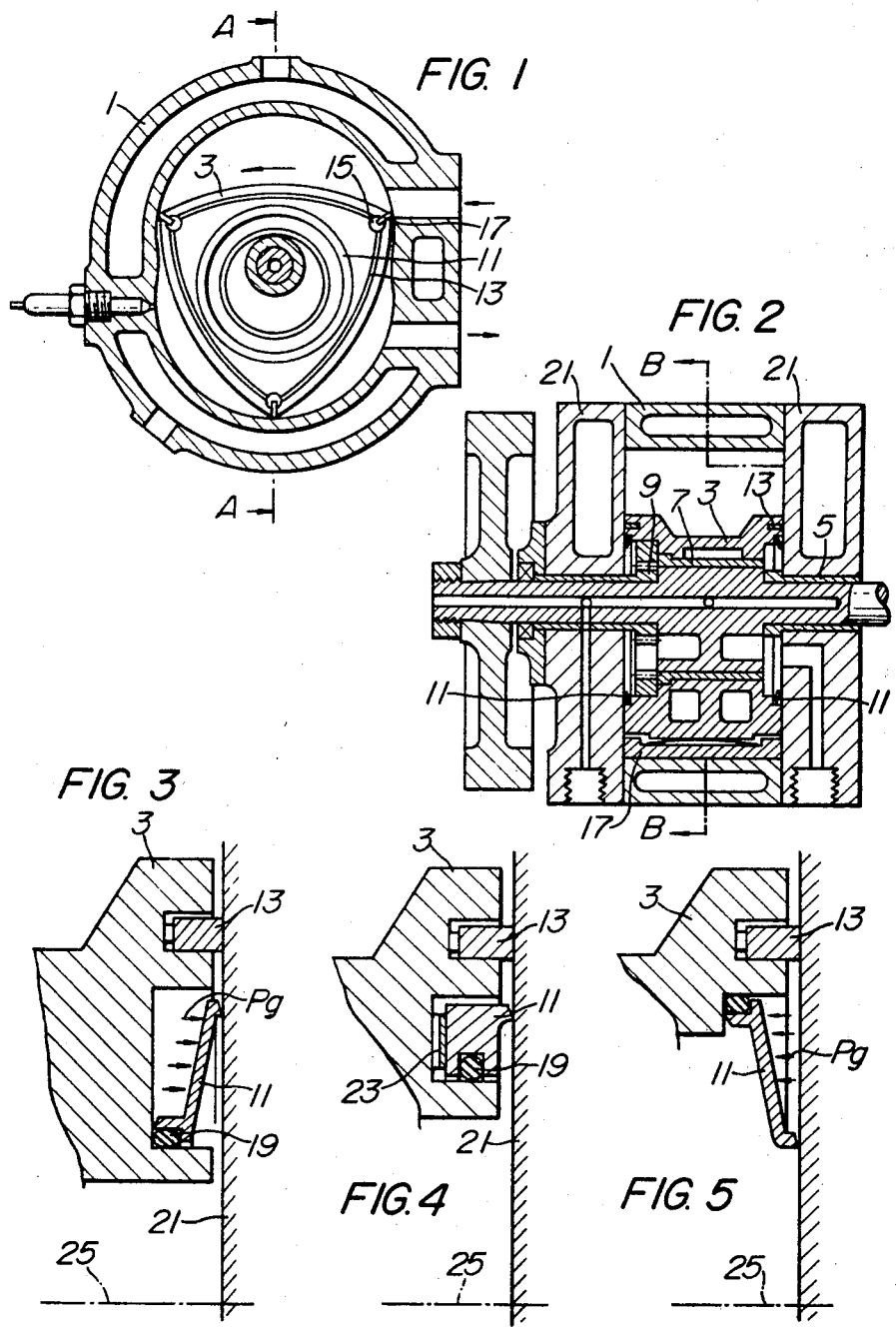
INVENTOR
Hiroshi Tado
BY Stevens, Davis, Miller & Mosher
ATTORNEYS United States Patent Office 3,396,708
Patented Aug. 13, 1968

3,396,708
OILTIGHT SEALING DEVICE FOR ROTARY PISTON ENGINES
Hiroshi Tado, Suita-shi, Japan, assignor to Yanmar Diesel Engine Co., Ltd., Osaka, Japan, a corporation of Japan
Filed Mar. 2, 1966, Ser. No. 531,254
Claims priority, application Japan, Mar. 11, 1965, 40/18,653
1 Claim. (Cl. 123—8)

ABSTRACT OF THE DISCLOSURE

An oiltight and gastight sealing device, for use in rotary piston engines of epitrochoidal profile, consisting of a sealing ring formed of resilient material and mounted on each side of the piston. The ring is shaped and disposed so that gas pressure leaking from the combustion chambers acts on the rear face of the ring to bias it towards the side wall of the housing thus forming a tight seal.

---

The present invention relates to a rotary piston engine of the type having a casing consisting of a central housing and side housings disposed on opposite sides of the central housing, a rotary shaft extending through the center of the central housing, and a rotary piston rotatably mounted on an eccentric portion of the rotary shaft for making rotation about the eccentric portion of the rotary shaft and at the same time making revolution about the axis of the rotary shaft at a fixed ratio of rotation as the rotary shaft rotates, and more particularly to oiltight sealing rings of annular shape mounted in recesses provided on axially opposite side faces of the rotary piston.

In the engine of this kind, spaces defined by the peripheral walls of the rotary piston and the inside face of the casing form the operating chambers in which suction, compression, expansion and exhaust strokes are repeated as the rotary piston rotates.

The rotary piston is internally provided with gears and bearings for the power transmission and is provided at its opposite ends with oiltight sealing rings in order to prevent lubricating oil having lubricated the gears and bearings from intruding into the operating chambers through the gaps between the side faces of the rotary piston and the side housings with which the rotary piston is in sliding contact. Oiltight sealing rings heretofore employed have been defective in that the lips of the rings are easily urged away from the inside faces of the side housings by the gas escaping past the side sealing members from that operating chamber which is acting as the combustion chamber and this gas is directly led into the lubricating oil in the engine with the result that the oil is liable to be contaminated. The prior sealing rings have also been defective in that the lips tend to move away from the rotary piston during rotation at high speed and increased consumption of lubricating oil generally results.

The primary object of the present invention is to eliminate the defects, as described above, of the prior oiltight sealing rings. According to the present invention, an improved oiltight sealing ring is provided which has its cross-sectional shape varied so that leaking gas pressure acts on the rear face of the ring and increases the contact pressure between the lip of the ring and the side housing and so that oil consumption and blow-through of gas can thereby be minimized.

The present invention will now be described with reference to the accompanying drawings in which;
FIG. 1 is a fragmentary sectional front elevational view of a rotary piston in a rotary piston engine, the section being taken on the line B—B in FIG. 2;
FIG. 2 is a sectional view taken on the line A—A in FIG. 1;
FIG. 3 is an enlarged sectional view of part of the rotary piston showing an oiltight sealing ring according to the invention as fitted in place;
FIG. 4 is a view similar to FIG. 3, but showing another embodiment according to the invention; and
FIG. 5 is a view generally similar to FIGS. 3 and 4 but showing a conventional oiltight sealing ring of this type as fitted in place.

In FIGS. 1 and 2, oiltight sealing rings 11 of endless annular shape are mounted on opposite end faces of a rotary piston 3 rotating in a direction of arrow within a central housing 1 in order that lubricating oil supplied to bearings 5, 7 and 9 may not leak into the combustion chambers. Side sealing members 13 and corner sealing members 15 are provided on the opposite end faces of the rotary piston 3 to maintain the gastightness at the side faces of the rotary piston, and apex sealing members 17 are provided at the apexes of the rotary piston 3 to maintain the gastightness of the rotary piston in its peripheral direction.

Preferred embodiments of the present invention are shown in FIGS. 3 and 4. As will be apparent from these figures, the oiltight sealing ring 11 is so shaped that leaking gas pressure $P_g$ escaping from the combustion chamber past the side sealing member 13 acts on the rear face of the sealing ring 11 to thereby increase the contact pressure between it and a side housing 21. Or more precisely, the cross-sectional shape of the oiltight sealing ring 11 is such that the oiltightness and gastightness maintaining portion (in circumferential direction) between the oiltight sealing ring 11 and the rotary piston 3 is positioned radially closer towards the center of the rotary piston than the oiltightness maintaining portion (in circumferential direction) between the oiltight sealing ring 11 and the side housing 21. A ring 19 of resilient material such as rubber is used to maintain the oiltightness and gastightness between the oiltight sealing ring 11 and the rotary piston 3. In the embodiment shown in FIG. 4, it is necessary to mount an auxiliary spring 23 on the rear face of the sealing ring 11 since the oiltight sealing ring of this embodiment has no spring action per se. The position of the lip of the sealing ring 11 may be radially closer towards the center line 25 of the rotary piston than the position as shown in order that the contact pressure can be maintained at an appropriate value.

Oiltight sealing rings hitherto employed have a cross-sectional shape as shown in FIG. 5. In the prior sealing ring, its lip is easily urged away from the inside face of the side housing, with which it is in sliding contact, by leaking gas pressure, and this has resulted in a great deal of lubricating oil consumption and gas blow-through. The use of the oiltight sealing ring according to the invention can reduce the lubricating oil consumption and gas blow-through and can attain the effect of improvement in the oiltight sealing function.

What is claimed is:
1. In a rotary piston internal combustion engine having a casing formed of a central housing and side housings on opposite sides thereof, a rotary shaft extending through said casing, and a rotary piston rotatably mounted on said shaft, an improved sealing ring comprising an annular ring of resilient material disposed in grooves on either side of said piston, said ring having substantially the form of a truncated cone with the smaller end thereof being bifurcated, a second ring of resilient material disposed in said groove tightly adjacent the side closest to the axis of said piston, said bifurcated end of said ring tightly engaging said second ring in both the radial and axial directions, said sealing ring flaring outwardly from said axis into constant resilient engagement with said side housings whereby gas pressure leaking from combustion chambers of said engine will further bias said sealing ring into gas tight engagement with said side housings.

References Cited

UNITED STATES PATENTS

| | | | |
|---|---|---|---|
| 3,165,259 | 1/1965 | Muller | 123—8 X |
| 3,180,563 | 4/1965 | Jones | 230—145 |

FOREIGN PATENTS

| | | |
|---|---|---|
| 181,592 | 6/1958 | Sweden. |
| 892,476 | 3/1962 | Great Britain. |

RALPH D. BLAKESLEE, *Primary Examiner.*